(12) United States Patent
Tipler

(10) Patent No.: US 8,017,081 B2
(45) Date of Patent: Sep. 13, 2011

(54) SYSTEM AND METHOD FOR MEASURING EFFECTIVE TEMPERATURE INSIDE A SEALED CONTAINER

(75) Inventor: Andrew Tipler, Trumbull, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 278 days.

(21) Appl. No.: 12/262,907

(22) Filed: Oct. 31, 2008

(65) Prior Publication Data

US 2009/0052497 A1     Feb. 26, 2009

Related U.S. Application Data

(63) Continuation of application No. 10/621,942, filed on Jul. 17, 2003, now Pat. No. 7,459,313, which is a continuation of application No. 10/079,712, filed on Feb. 20, 2002, now Pat. No. 6,645,773.

(51) Int. Cl.
*G01N 7/00* (2006.01)
(52) U.S. Cl. ........... 422/83; 422/89; 436/161; 73/19.02; 73/23.35; 73/64.45
(58) Field of Classification Search .................. 436/161; 73/19.02, 23.35, 64.45; 422/83, 89
See application file for complete search history.

(56) References Cited

U.S. PATENT DOCUMENTS

| | | | |
|---|---|---|---|
| 3,753,369 A | 8/1973 | Fowler et al. | |
| 4,670,400 A | 6/1987 | Leenders et al. | |
| 5,405,836 A * | 4/1995 | Richar et al. | 514/23 |
| 5,431,023 A | 7/1995 | Howard et al. | |
| 5,441,700 A | 8/1995 | Markelov | |
| 5,792,423 A | 8/1998 | Markelov | |
| 5,932,482 A | 8/1999 | Markelov | |
| 6,146,895 A | 11/2000 | Green et al. | |

OTHER PUBLICATIONS

Penton, Zelda, "Headspace Measurement of Ethanol in Blood by Gas Chromatography" Clin. Chem. 31/3, 439-441 (1985).*
James Chickos, et al.; Sublimation enthalphies at 298.15K using gas chromatography and differential scanning calorimetry measurements; 1998; 10 pages.

* cited by examiner

*Primary Examiner* — In Suk Bullock
*Assistant Examiner* — Paul S Hyun
(74) *Attorney, Agent, or Firm* — St. Onge Steward Johnston & Reens LLC

(57) ABSTRACT

A system and method of measuring the effective temperature inside a sealed container having a headspace is provided. A liquid solvent is added to the container, and a solid compound is added to the liquid solvent to create a saturated solution. Vapor of the saturated solution is allowed to equilibrate in the headspace of the sealed container, and a volume thereof is transferred to a chromatographic column, where chromatographic readings of the equilibrated vapor are taken. A temperature within the sealed container is then calculated based upon the chromatographic readings of the equilibrated vapor, wherein the temperature calculation is based upon the concentrations of the liquid solvent and the solid compound in the equilibrated vapor.

8 Claims, 3 Drawing Sheets

SYSTEM AND METHOD FOR MEASURING EFFECTIVE TEMPERATURE INSIDE A SEALED CONTAINER

CROSS-REFERENCE TO RELATED APPLICATIONS

This application is a continuation of U.S. patent application Ser. No. 10/621,942, filed Jul. 17, 2003, now issued as U.S. Pat. No. 7,459,313, which is a continuation of U.S. patent application Ser. No. 10/079,712, filed Feb. 20, 2002, now issued as U.S. Pat. No. 6,645,773.

FIELD OF THE INVENTION

The present invention relates to a system and method of analyzing materials, and more particularly, to a system and method of accurately measuring the effective temperature inside a sealed container, such as a headspace vial.

BACKGROUND OF THE INVENTION

The technique of equilibrium headspace extraction involves placing a liquid or solid sample into a suitable sealed vial and allowing volatile analytes within the sample to reach equilibration in concentration between the sample matrix and the vapor above it (i.e., the headspace). A fixed volume of the vapor is then transferred to a gas chromatograph for analysis. At equilibration, the concentration of each analyte in the headspace is defined by the amount of the analyte present, the volumes of the two phases and the partition coefficient for that analyte between the two phases. The partition coefficient, which is a thermodynamic property, is highly dependent on temperature and so must be carefully controlled within the instrumentation if good analytical precision is to be achieved.

Current state-of-the-art headspace samplers, such as the model TurboMatrix Automatic Headspace Sampler distributed by PerkinElmer Instruments LLC, are designed to maintain a very stable vial temperature by making use of a large thermostatted metal oven block. However, despite the fact that stable vial temperatures can be maintained, a number of issues regarding temperature control remain.

For example, the true temperature of the vial may not be accurately measured. The electronic sensor used to monitor temperature is typically located within a heating belt that surrounds the oven block and is remote from the vial. As such, the temperature reading may not reflect the true vial temperature at all settings. Moreover, it is possible that all vial positions may not be at the same temperature.

Another issue may arise when a new (cold) vial is inserted into the oven block. In such a case, there may be a drop in temperature in one or more of the other vials which cannot be readily detected using known methods. Furthermore, known methods of temperature measurement may not take into account the fact that the vial temperature may change over time.

Another potential issue is that certain requirements, such as GLP (Good Laboratory Practices) certification standards and FDA (Food and Drug Administration) approval requirements, may require that the vial temperature be monitored and/or calibrated.

In addition, some instruments which are not state-of-the-art may be weak in the area of vial temperature control. As such, it may be desirable to evaluate the performance of such instruments using a simple method for temperature measurement.

Traditionally, a thermocouple or similar temperature-measuring probe would be inserted into the vial. However, this technique is tedious to perform, interrupts the normal operation of the instrument, and requires special tools. Moreover, taking a reading from a single point inside the vial may not truly reflect the "effective" temperature of the whole vial. Instead, it would be more desirable to make use of a suitable sample in a vial and use chromatography to determine temperature—after all, it is this process for which standardization is being attempted.

What is desired, therefore, is a system and method of measuring the effective temperature inside a sealed container which accurately reflects the true container temperature at all instrument settings, which takes into account temperature variations across various container positions, which measures the temperature of each container separately from other containers when a plurality of containers are used, which takes into account the fact that the container temperature may change over time, which allows for temperature calibration, which can be used to evaluate the temperature control performance of an instrument, which is easy to perform, which does not interrupt the normal operation of the instrument, which does not require special tools, and which uses chromatography to determine temperature.

SUMMARY OF THE INVENTION

Accordingly, it is an object of the present invention to provide a system and method of measuring the effective temperature inside a sealed container which accurately reflects the true container temperature at all instrument settings.

Another object of the present invention is to provide a system and method of measuring the effective temperature inside a sealed container having the above characteristics and which takes into account temperature variations across various container positions.

A further object of the present invention is to provide a system and method of measuring the effective temperature inside a sealed container having the above characteristics and which measures the temperature of each container separately from other containers when a plurality of containers are used.

Still another object of the present invention is to provide a system and method of measuring the effective temperature inside a sealed container having the above characteristics and which takes into account the fact that the container temperature may change over time.

Yet a further object of the present invention is to provide a system and method of measuring the effective temperature inside a sealed container having the above characteristics and which allows for temperature calibration.

Still a further object of the present invention is to provide a system and method of measuring the effective temperature inside a sealed container having the above characteristics and which can be used to evaluate the temperature control performance of an instrument.

Still a further object of the present invention is to provide a system and method of measuring the effective temperature inside a sealed container having the above characteristics and which is easy to perform.

Yet another object of the present invention is to provide a system and method of measuring the effective temperature inside a sealed container having the above characteristics and which does not interrupt the normal operation of the instrument.

Still a further object of the present invention is to provide a system and method of measuring the effective temperature inside a sealed container having the above characteristics and which does not require special tools.

Yet still a further object of the present invention is to provide a system and method of measuring the effective temperature inside a sealed container having the above characteristics and which uses chromatography to determine temperature.

These and other objects of the present invention are achieved by provision of system and method of measuring the effective temperature inside a sealed container having a headspace. A liquid solvent is added to the container, and a solid compound is added to the liquid solvent to create a saturated solution. Vapor of the saturated solution is allowed to equilibrate in the headspace of the sealed container, and a volume thereof is transferred to a chromatographic column, where chromatographic readings of the equilibrated vapor are taken. A temperature within the sealed container is then calculated based upon the chromatographic readings of the equilibrated vapor, wherein the temperature calculation is based upon the concentrations of the liquid solvent and the solid compound in the equilibrated vapor.

Preferably, the chromatographic readings comprise readings of peak areas of the liquid solvent and the solid compound. Most preferably, the calculating step comprises the step of calculating a temperature within the sealed container based upon a ratio of the readings of peak areas of the liquid solvent and the solid compound.

In one preferred embodiment, the liquid solvent comprises n-dodecane and the solid compound comprises naphthalene. In another embodiment, the liquid solvent comprises n-octadecane and the solid compound comprises anthracene.

The invention and its particular features and advantages will become more apparent from the following detailed description considered with reference to the accompanying drawings.

DETAILED DESCRIPTION OF THE INVENTION

In arriving at the present invention, consideration was given to making use of temperature dependence of partition coefficients in order to determine the effective temperature within a vial. In accordance with such a method, a solution of two solutes in a suitable solvent would be prepared. The solutes and solvent would be chosen so that their partition coefficients exhibited different temperature profiles. Their relative concentrations (hence chromatographic peak sizes) would be a measure of the temperature. However, it was found that this approach may be undesirable because it would rely on very precise control of concentrations and volumes. Moreover, the compounds would have to be chemically similar so that their relative response factors on the GC detector would be constant, and differences in partition coefficient profiles would therefore be subtle.

Consideration was also given to making use of temperature dependence of vapor pressures in order to determine the effective temperature within a vial. In accordance with this method, an excess of a suitable compound disposed in a thermostatted headspace vial would saturate the headspace with compound vapor. The concentration of the vapor at the saturation point would be proportional to the vapor pressure. Vapor pressure is dependent upon temperature and so the concentration of vapor in the headspace is temperature dependent. By choosing two compounds with different vapor pressure curves, the ratio of their concentrations (hence chromatographic peak sizes) would be a measure of temperature.

However, it was found that this approach may be undesirable because when two compounds are mixed together, there is a change to their respective vapor pressures that is concentration dependent and so results are difficult to predict.

In order to overcome the deficiencies of the prior art and to avoid the concerns expressed with respect to the approaches described above, it was decided upon to make use of temperature dependence of solubility and vapor pressure.

Figure 1:
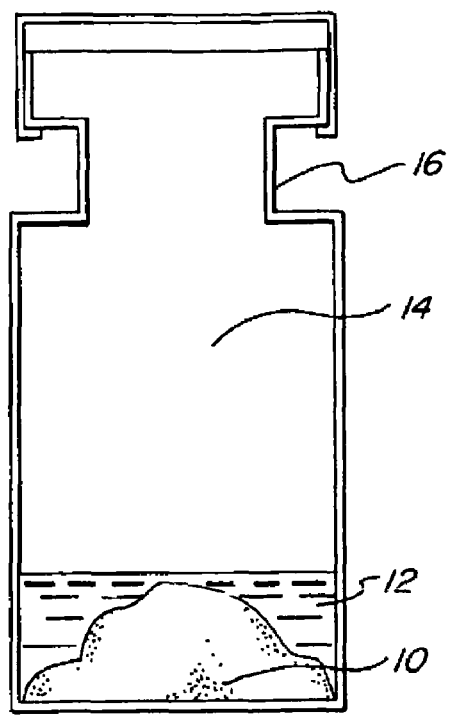
FIG. 1 is a schematic view of a sealed vial for which the temperature can be measured in accordance with the present invention.

Referring to FIG. 1, this method relies on the solubility of a solid compound 10 in a suitable liquid solvent. Sufficient solid 10 is added to ensure that a saturated solution 12 is produced. The saturation concentration is highly temperature dependent but should always be the same at any given temperature. This effect will also mean that the concentration of both compound vapors in the headspace 14 inside a sealed vial 16 containing the saturated solution 12 will also be predictable at any given temperature. The compound concentrations in the headspace 14 are now dependent on both liquid solubility and vapor pressure and should give an enhanced temperature effect.

In one preferred embodiment, naphthalene was chosen as the solid compound and n-dodecane was chosen as the liquid solvent. These compounds were found to be appropriate for a number reasons, such as the fact that they are both hydrocarbons and should give relative response factor reproducibility on all flame ionization detectors. Moreover, n-dodecane becomes saturated with naphthalene at concentrations of approximately 30% at ambient temperature, which simplifies the measuring process. Furthermore, the vapor pressures of pure n-dodecane and pure naphthalene are similar, they are chromatographically-friendly compounds that can be run on almost any column, and their vapor pressure curves are significantly different.

However, it should be understood that the combination of n-dodecane and naphthalene is not meant to be limiting in any way, and the use of numerous combinations of compounds with the inventive measurement method is contemplated. More specifically, experiments have shown that the use of n-dodecane and naphthalene may be limited to temperatures in the region of about 40 to 70° C. (naphthalene melts at 800° C.). For higher temperatures, other compounds, such a combination of n-octadecane and anthracene, may be used without departing from the present invention.

The general procedure employed with the present invention involves the following steps. First, a vial containing an approximately 10-90 mix of n-dodecane and naphthalene is placed into a headspace sampler and allowed to thermostat (i.e., typically for about 20 minutes) at the set temperature. Next, a suitable volume of the equilibrated headspace vapor is transferred to a chromatographic column for determination.

Finally, the temperature of the headspace vial is derived from the ratio of the two peak areas, as more fully discussed below.

Theoretical Model

The vapor pressure of a component in a binary mixture may be conveniently described by Raoult's Law as:

$$\frac{(p^0 - p)}{p^0} = x = \frac{n_2}{(n_1 + n_2)} \quad (1)$$

Figure 2:
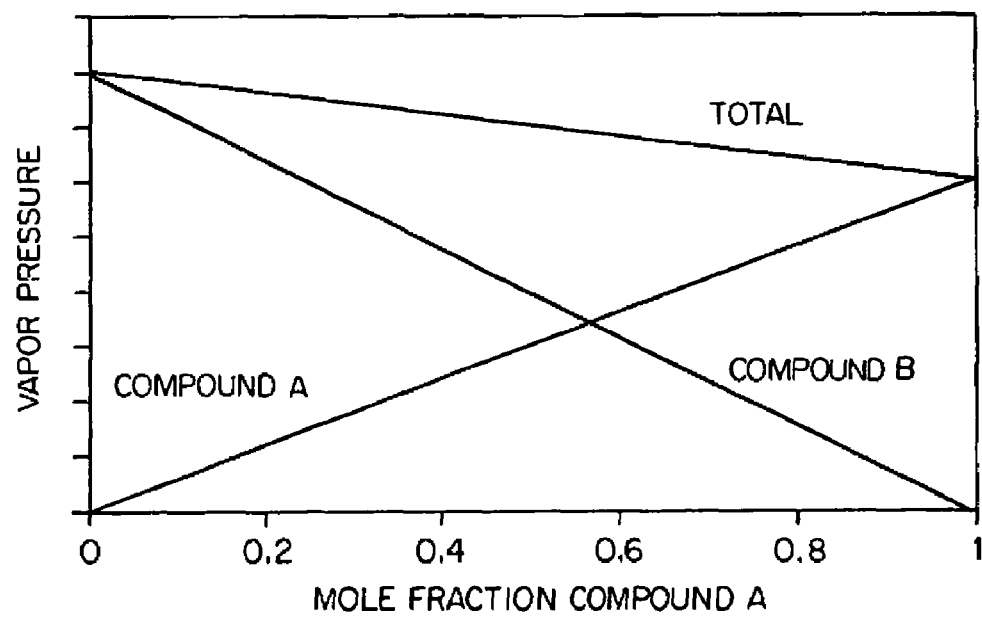
FIG. 2 is a graphical representation of the ideal vapor pressure behavior for a binary mixture according to Raoult's Law as employed by the present invention.

Where:
- $p^0$ is the vapor pressure of the compound in the mixture
- $p$ is the vapor pressure of the pure compound
- $x$ is the mole fraction of the compound in the mixture
- $n_1$ is the number of moles of the other compound
- $n_2$ is the number of moles of the compound being studied FIG. 2, which graphically illustrates the ideal vapor pressure behavior for a binary mixture according to Raoult's Law, shows how the relative vapor pressure, hence vapor phase concentration, of each component depends on the concentration of that component in the liquid mixture and the vapor pressure of the pure compound. If the vapor were to be chromatographed, then the peak area ratio for the two compounds would be dependent on both their liquid concentrations and pure vapor pressures.

The concentration of a saturated solution of naphthalene in n-dodecane is temperature dependent and may again be described by another form of Raoult's Law as:

$$x = \frac{n_2}{(n_1 + n_2)} = e^{\left[-\frac{L_f}{R}\left(\frac{T_0 - T}{T_0 \cdot T}\right)\right]} \quad (2)$$

Where:
- $L_f$ is the molar heat of fusion
- $R$ is the gas constant
- $T_0$ is the compound freezing point absolute temperature
- $T$ is the absolute temperature of the solution The dependence of vapor pressure of a pure substance on temperature may be described by the Clapeyron-Clausius Equation as:

$$p = e^{\left(-\frac{L_v}{RT} + C\right)} \quad (3)$$

Where:
- $L_v$ is the molar heat of vaporization
- $C$ is a constant

It should be noted, however, that in practice, deviations from Equations 1, 2 and 3 may be expected because of intermolecular forces. Therefore, these relationships should be used only for guidance.

Equations 1, 2 and 3 may be combined to give Equations 4 or 5, which relate the predicted vapor pressure, $p_0$, for a component in a saturated mixture to temperature, T, as follows:

$$p_0 = \frac{e^{\left[-\frac{L_v}{RT} + C\right]}}{1 - e^{\left[\frac{L_f}{R}\left(\frac{T_0 - T}{T_0 \cdot T}\right)\right]}} \quad \text{or} \quad (4)$$

$$p_0 = \frac{a \cdot e^{\frac{b}{T}}}{1 - c \cdot e^{\frac{d}{T}}} \quad (5)$$

Where:
- a is a constant
- b is a constant
- c is a constant
- d is a constant

The ratio of the observed vapor pressures would be:

$$\frac{p_0}{p_0'} = \frac{a \cdot e^{\frac{b}{T}}}{a' \cdot e^{\frac{b'}{T}}} \cdot \frac{1 - c' \cdot e^{\frac{d'}{T}}}{1 - c \cdot e^{\frac{d}{T}}} \quad (6)$$

Where:
- $p_0'$ is the predicted vapor pressure for the second compound
- a' is a constant relating to the second compound
- b' is a constant relating to the second compound
- c' is a constant relating to the second compound
- d' is a constant relating to the second compound Equation 6 may be reduced to the final form:

$$\frac{p_0}{p_0'} = \frac{a \cdot e^{\frac{b}{T}} - c \cdot e^{\frac{d}{T}}}{1 - f \cdot e^{\frac{g}{T}}} \quad (7)$$

Where:
- a is a constant
- b is a constant
- c is a constant
- d is a constant
- f is a constant
- g is a constant Because compound concentration and hence chromatographic peak area is proportional to the vapor pressure, Equation 7 also applies to the peak area ratio, as described more fully below.

Figure 3:
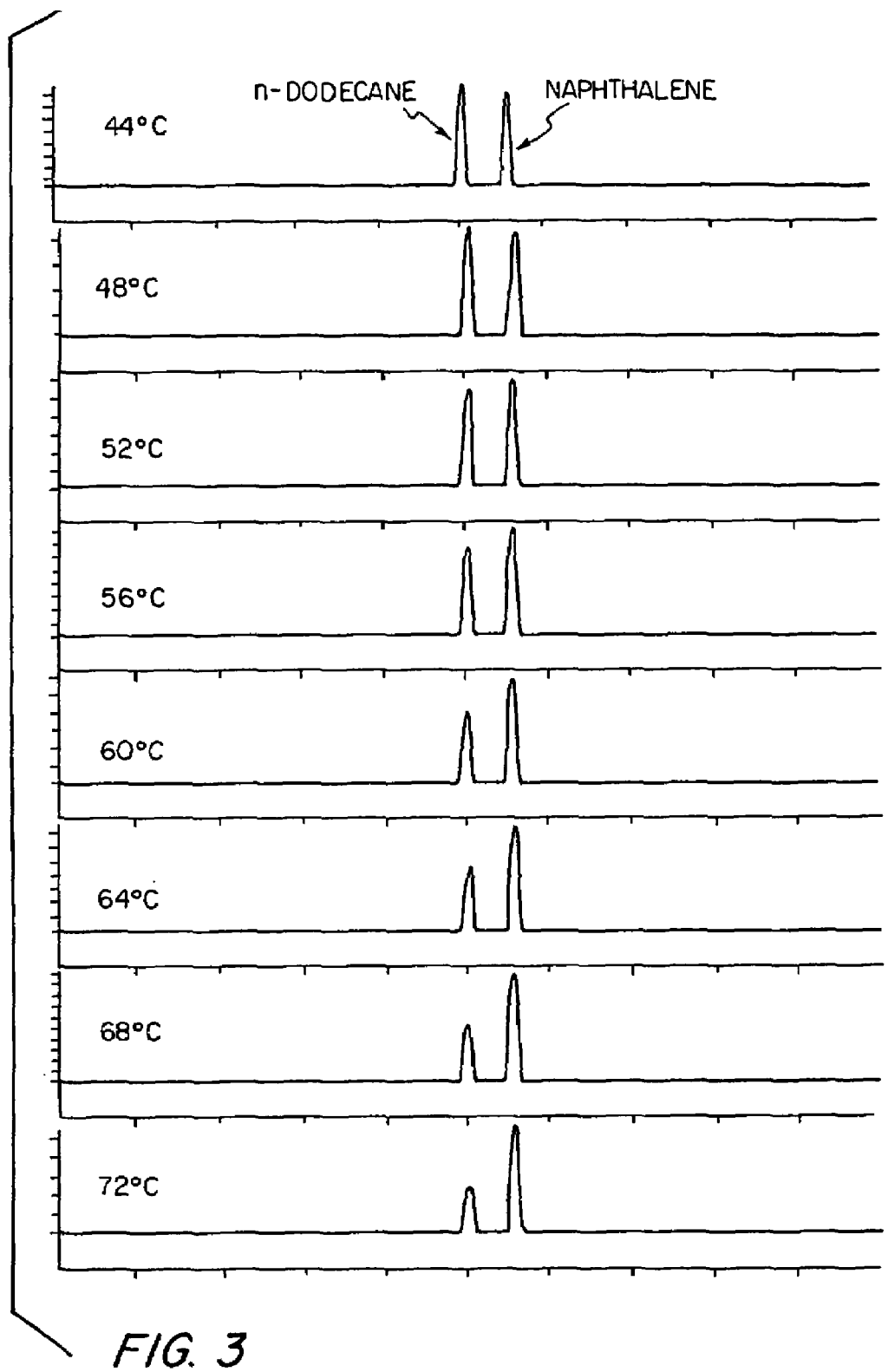
FIG. 3 is a graphical representation of chromatograms of a n-dodecane and naphthalene test mix thermostatted over a range of temperatures which illustrates a portion of the theory underlying the present invention.
Figure 4:
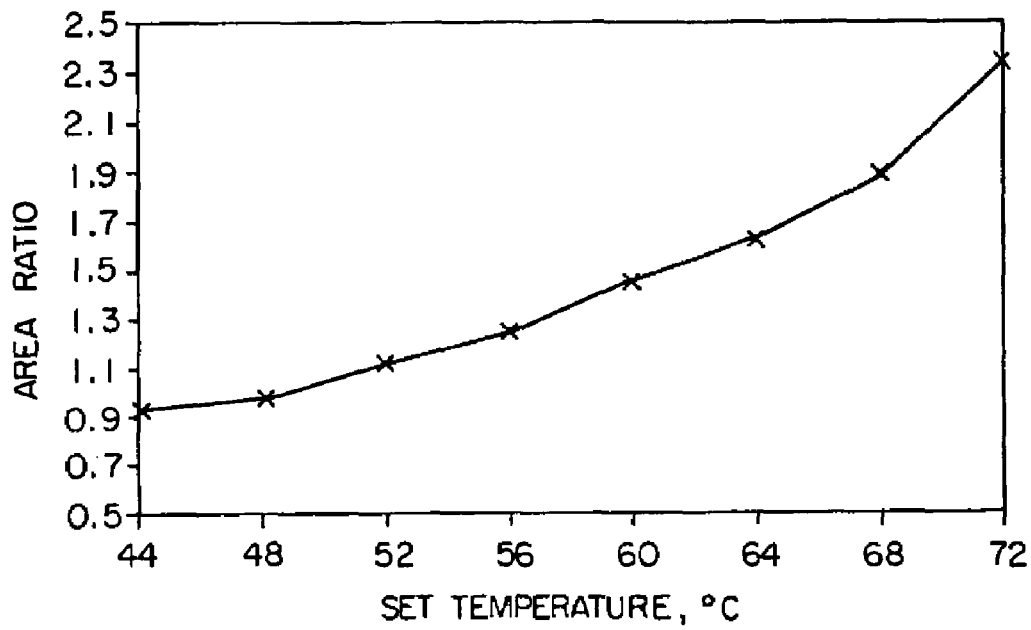
FIG. 4 is a plot of area ratio (naphthalene/n-dodecane) versus set temperature in ° C. which illustrates a portion of the theory underlying the present invention.

FIG. 3 shows chromatograms of the n-dodecane and naphthalene test mix thermostatted over a range of temperatures. The experimental conditions are given in Table 1. FIG. 4 shows a plot of area ratio (naphthalene/n-dodecane to give a positive slope) versus set temperature in ° C. The non-smoothness in the plot may be caused by errors in the measurement or may be a true indication of varying vial temperature (readings were taken with different vials, in different carousel positions and at different times).

TABLE 1

| Experimental Conditions | |
|---|---|
| Chromatograph | AutoSystem XL (PerkinElmer Instruments) |
| Column | 30 m × 0.32 mm × 1.0 μm PE-5 (PerkinElmer Instruments) |
| Oven | 200° C. Isothermal |
| Carrier Gas | Helium at 12.5 psig with PPC |
| Interface | Split injector at 250° C. with low dead volume liner |
| Detector | FID at 300° C., range x1, attenuation x4 |
| Headspace | HS40 XL (PerkinElmer Instruments) |
| Thermostat Temp. | 44° C. to 72° C. in 4° increments |
| Thermostat Time | 20 min. |
| Pressure | 15 psig with PPC |

TABLE 1-continued

Experimental Conditions

| | |
|---|---|
| Press Time | 1 min. |
| Inject Time | 0.02 min. |
| Withdrawal Time | 0.5 min. |
| Sample | 180 mg naphthalene and 20 mg n-dodecane in 22-ml vial |

Figure 5:
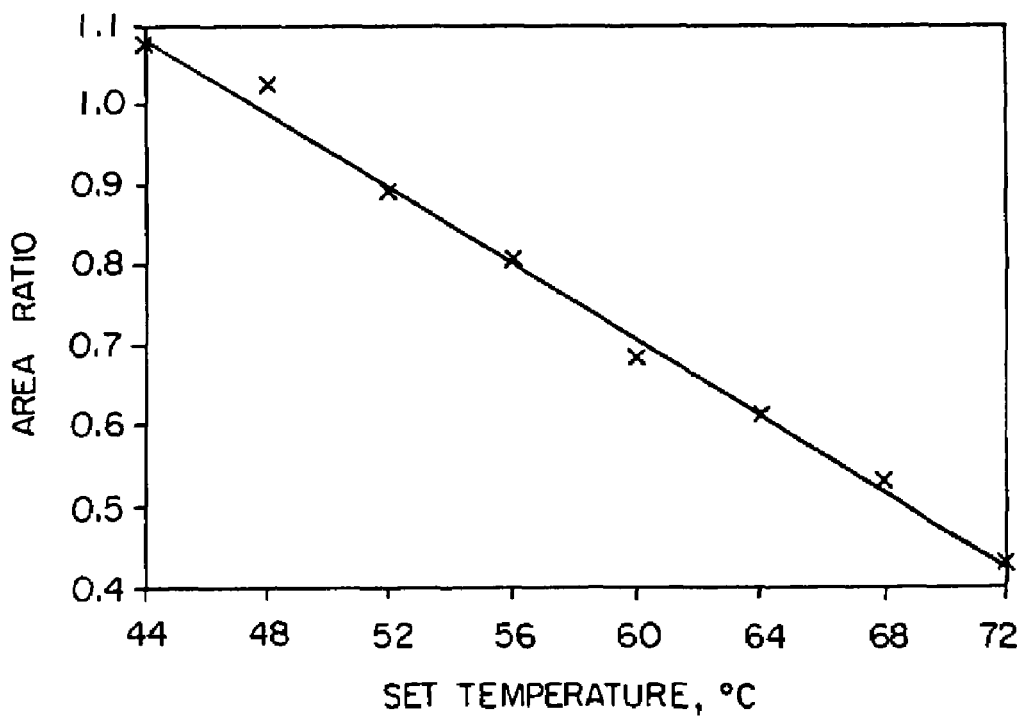
FIG. 5 is a plot of a linear relationship between the areas of naphthalene and n-dodecane which illustrates a portion of the theory underlying the present invention.

By inverting the area ratios, the data seems to approximate to the following simple linear relationship, which is also plotted in FIG. 5:

$$\frac{Area_{Dodecane}}{Area_{Naphthalene}} = 2.094 - 0.02313 \cdot T \quad (8)$$

Thus, solving Equation 8 for T, the temperature of the vial can be determined by employing a chromatograph to measure the peak areas for n-dodecane and naphthalene.

The present invention, therefore, provides a method of measuring the effective temperature inside a sealed container which accurately reflects the true container temperature at all instrument settings, which takes into account temperature variations across various container positions, which measures the temperature of each container separately from other containers when a plurality of containers are used, which takes into account the fact that the container temperature may change over time, which allows for temperature calibration, which can be used to evaluate the temperature control performance of an instrument, which is easy to perform, which does not interrupt the normal operation of the instrument, which does not require special tools, and which uses chromatography to determine temperature.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for determining temperature within a sealed container comprising:
   a saturated solution, and equilibrated vapor thereof, of a solvent and a compound disposed within the sealed container; and
   a chromatograph that takes chromatographic readings of the equilibrated vapor, wherein the temperature within the sealed container is calculated based upon the chromatographic readings, and
   wherein the solvent comprises a liquid, and
   wherein the solvent comprises n-dodecane or n-octadecane.

2. The system of claim 1 wherein the temperature is further calculated by the system based upon the concentrations of the solvent and the compound in the equilibrated vapor.

3. The system of claim 2 wherein the chromatographic readings comprise readings of peak areas of the solvent and the compound.

4. The system of claim 3 wherein the temperature is further calculated by the system based upon a ratio of the readings of peak areas of the solvent and the compound.

5. A system for determining temperature within a sealed container comprising:
   a saturated solution, and equilibrated vapor thereof, of a solvent and a compound disposed within the sealed container; and
   a chromatograph that takes chromatographic readings of the equilibrated vapor, wherein the temperature within the sealed container is calculated based upon the chromatographic readings, and
   wherein the compound comprises a solid, and
   wherein the compound comprises naphthalene or anthracene.

6. The system of claim 5 wherein the temperature is further calculated by the system based upon the concentrations of the solvent and the compound in the equilibrated vapor.

7. The system of claim 6 wherein the chromatographic readings comprise readings of peak areas of the solvent and the compound.

8. The system of claim 7 wherein the temperature is further calculated by the system based upon a ratio of the readings of peak areas of the solvent and the compound.

* * * * *